Feb. 20, 1934.                R. C. RICKETTS                1,948,132
                                 BROODER
                            Filed Dec. 9, 1931            4 Sheets-Sheet 1
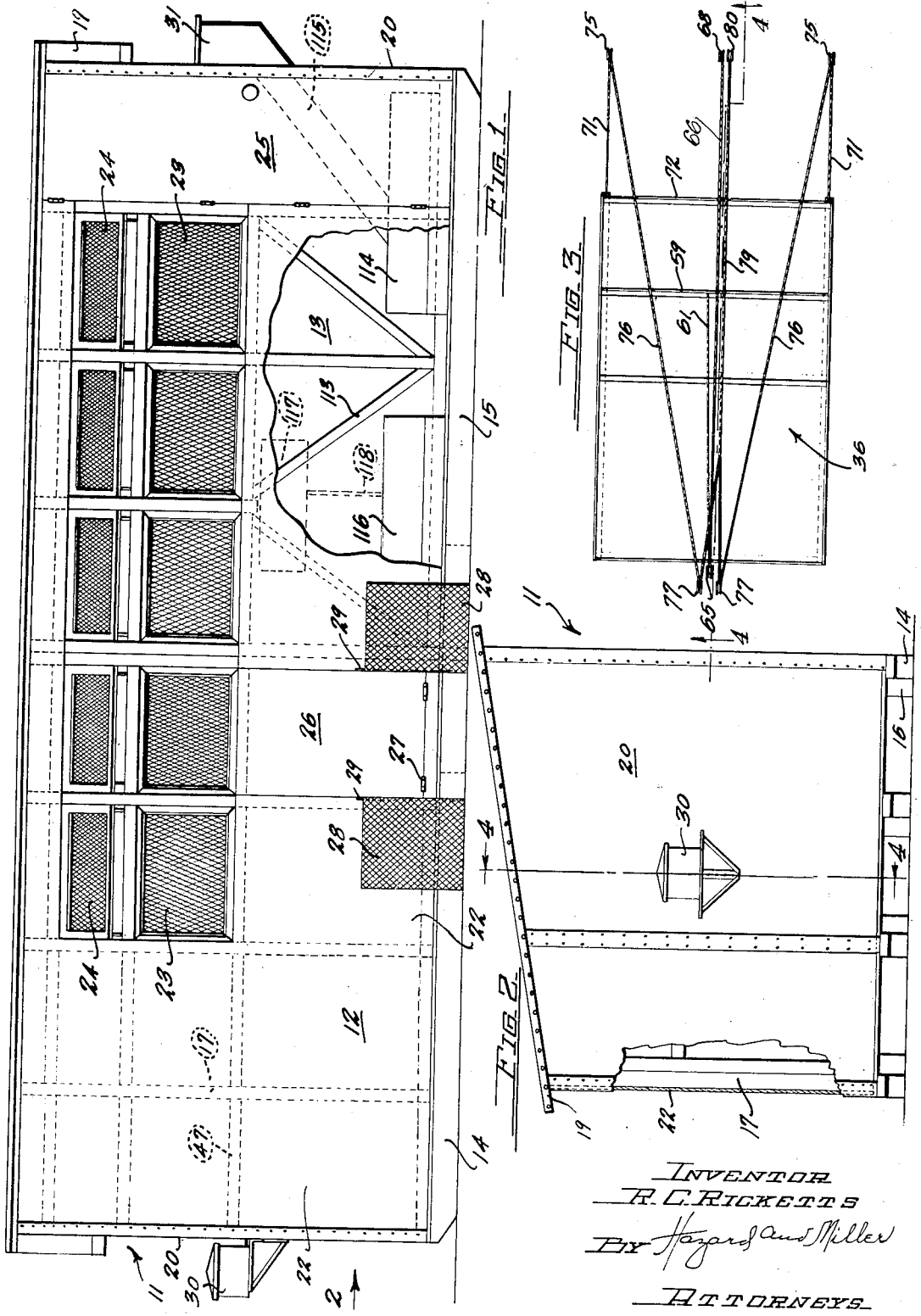
INVENTOR
R. C. RICKETTS
BY Hazard and Miller
ATTORNEYS

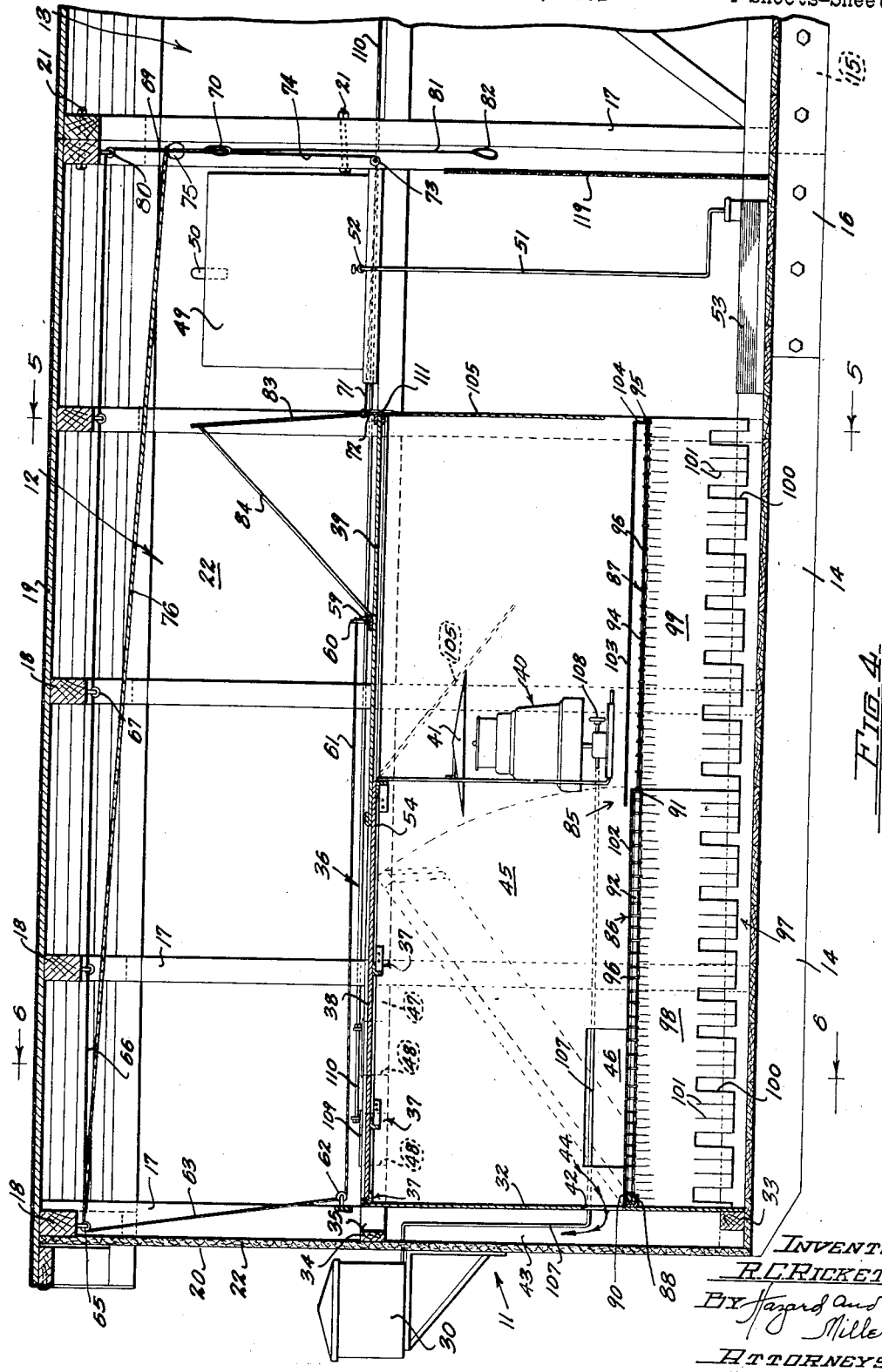

Feb. 20, 1934.  R. C. RICKETTS  1,948,132
BROODER
Filed Dec. 9, 1931  4 Sheets-Sheet 3
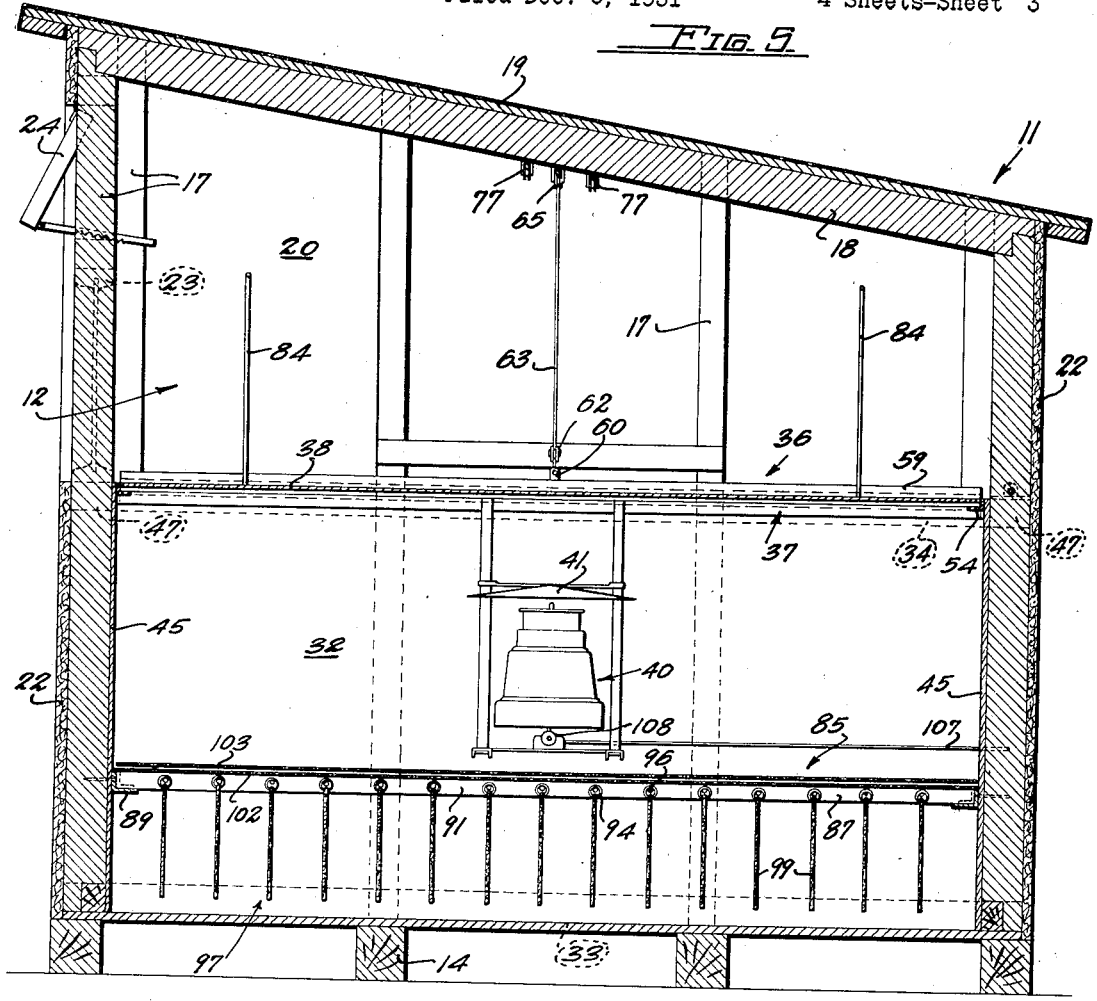
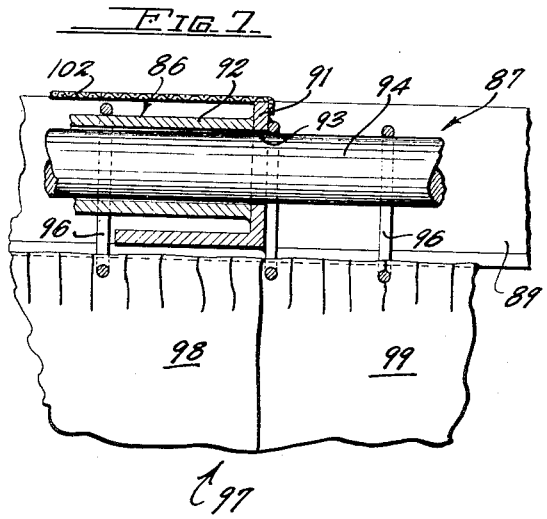
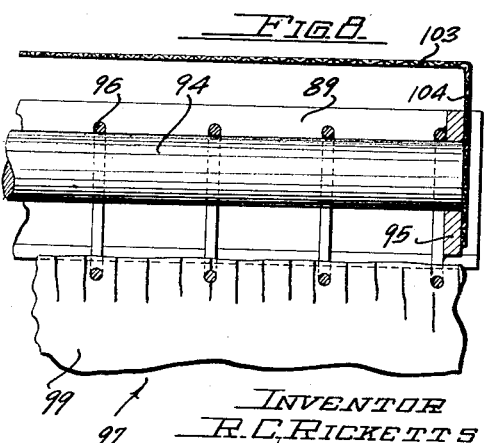
INVENTOR
R. C. RICKETTS
By Hazard and
Miller
ATTORNEYS Feb. 20, 1934.   R. C. RICKETTS   1,948,132
BROODER
Filed Dec. 9, 1931   4 Sheets-Sheet 4
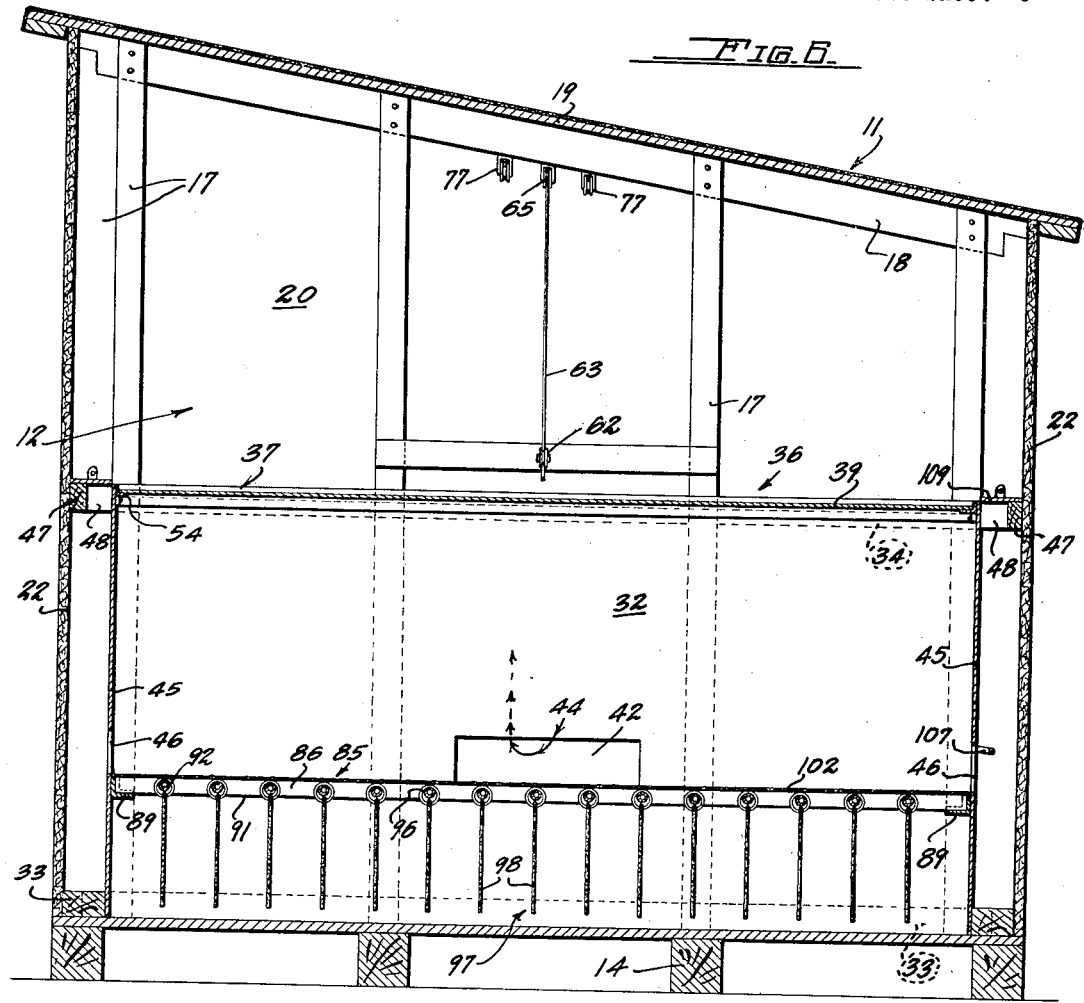
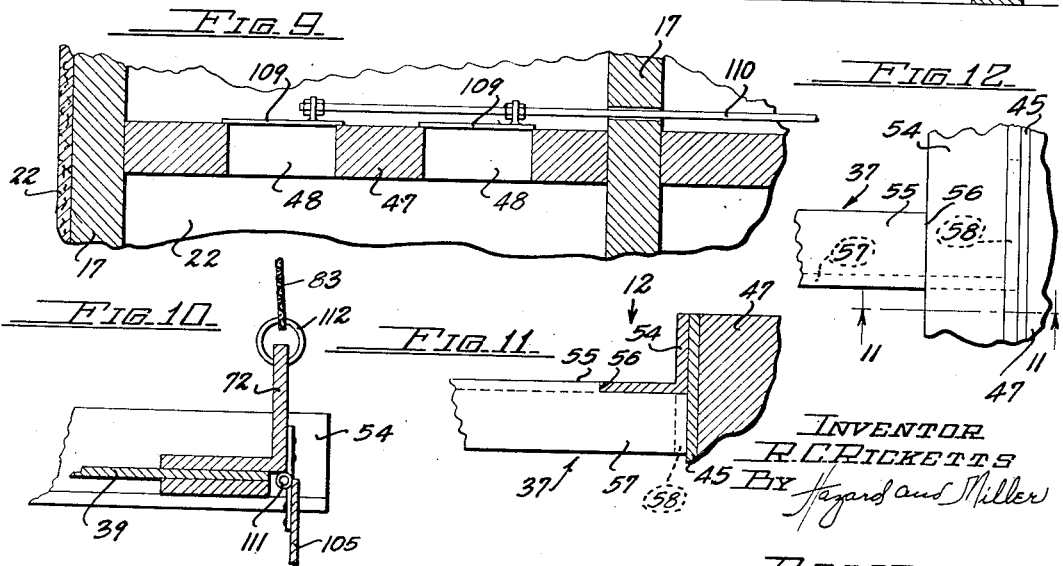

Patented Feb. 20, 1934

1,948,132

UNITED STATES PATENT OFFICE 1,948,132

BROODER

Roland Curt Ricketts, Sunnymead, Calif., assignor of one-third to Bruce Alfred Ricketts, Sunnymead, Calif.

Application December 9, 1931. Serial No. 579,861

15 Claims. (Cl. 119—32)

My invention relates to a brooder for poultry of what I term an outer type, that is, the brooder is constructed in a small portable house independently of the general poultry house, which house is of such construction that it may be readily disassembled for packing and again assembled for use and which, in addition, may also be moved when assembled from one place to another in a poultry raising farm or ranch.

As to the brooder features of my invention, considerable difficulty has been experienced in the past with the poultry being raised huddling and crowding together and thus crushing one another or causing suffocation of numbers of the poultry which it is attempted to raise by the artificial brooding. This has been a severe loss to poultry raisers but most of the brooders employing artificial heat are subject to this objection.

One of the objects, therefore, of my invention in connection with the brooder is the construction of a device in which the young poultry may hover and still maintain the proper degree of warmth without crowding or huddling together, and a construction which eliminates the danger of such crowding and thereby eliminates the piling of the chicks on top of each other. In more detail, an object and feature of my invention in connection with the hover is the provision of a series of curtains, these being suspended but being arranged to allow the heat from a central heating source to pass downwardly between the curtains and maintain the young poultry, which may move freely between and through the curtains, at the desired degree of warmth. This also provides for proper ventilation, giving them sufficient fresh air.

Another feature of this construction is providing the hover with a plurality of longitudinally arranged curtains, these curtains being spaced apart, forming rows. The lower edge of the curtain is notched to provide transverse openings in each curtain for the passage of the poultry from one row to another, and also the curtains are provided with slits at the bottom to more readily facilitate the movement of the individual chicks or the mass of poultry as a whole. The lower edge of the curtain is positioned above the floor of the brooder to prevent contamination with dirt and allow free passing movement of the young poultry.

Another object and feature of my invention in connection with the hover is placing the source of artificial heat above the curtains and having the air currents deflected downwardly so that the curtains and the open spaces of the rows between the curtains will have the desired temperature and sufficient free circulation of air to maintain adequate ventilation.

Another feature of my invention in connection with the hover is arranging the curtains on poles formed in telescopic sections whereby the outer section may be telescoped in an inner section of the pole and the curtain which is mounted on rings becomes folded in such telescopic action. Another feature is that the curtain rods when telescoped may be tilted upwardly as a unit to elevate the curtains to a sufficient height to permit cleaning of the floor of the brooder underneath the curtains.

Another detailed feature as relates to the hover is forming a screen cover over the fixed portion of the curtains and a movable screen over the extension poles having the extension curtains, this being to prevent the poultry from jumping up on top of the curtains. With this feature I also provide a depending panel which prevents them from jumping on top of the screens from the space at the ends of the curtains.

Another feature of my invention relates to the ventilation system in which the brooder is provided with a canopy over the hover at about half the elevation of the house. This canopy has a fixed section and a slidable extension so that when the extension is thrust back or inwardly, ready access may be had to the source of heat suspended from the canopy and also to the hovers having the curtains. This canopy also prevents the warm air from the heater from ascending directly to the roof of the brooder house, but I force a circulation by means of air circulation openings in an inside wall, the openings being immediately above the curtains, causing first a downflow of the heated air with its outlet through said openings; the air then rises between the inner and outer walls of the brooder house and enters a space between the canopy and the roof. I arrange the circulation so that the hot and exhausted air is discharged through a ventilating window in one portion of the brooder and fresh air is drawn in at another portion of the brooder.

Another detailed feature in connection with the ventilation system and the canopy is the provision of operating cords which are positioned for ready handling and may be utilized to pull the extension canopy outwardly or to withdraw it inwardly into its housed position.

Other features of the brooder relate to the supply of fuel to the heater when an oil heater is used and also to a supply of warm water for the young poultry, and the feeding arrangement.

One of the main characteristics of my invention is that the brooder may be readily moved from one place to another on a farm or ranch to place it on fresh soil and thus remove the young poultry from danger of disease from a constantly used poultry yard or the like. In connection with the brooder, another important feature is that the interior floor is free of obstructions except for the water and feeding troughs and, therefore, may readily be kept in a sanitary condition.

My invention is illustrated in the accompanying drawings, in which:

Fig. 1 is a front elevation showing the exterior of the brooder;

Fig. 2 is an end elevation taken in the direction of the arrow 2 of Fig. 1 omitting the exterior structure on the front and back;

Fig. 3 is a partial interior plan in diagram showing the operating cables for a movable canopy section;

Fig. 4 is a vertical longitudinal section through part of the brooder on the line 4—4 of Fig. 2 or Fig. 3 taken substantially through the longitudinal center but to one side of the heater;

Fig. 5 is a vertical transverse section on the line 5—5 of Fig. 4 in the direction of the arrows, the cables 76 not being shown;

Fig. 6 is a vertical transverse section on the line 6—6 of Fig. 4 in the direction of the arrows, the cables 76 not being shown;

Fig. 7 is a detail longitudinal section of the mounting for the telescopic sections of the brooder construction;

Fig. 8 is a detail longitudinal section of the outer section of the hover;

Fig. 9 is a vertical section showing ventilating dampers;

Fig. 10 is an enlarged longitudinal sectional detail of the end structure of the movable section of the canopy and of the hinged heat retaining plate;

Fig. 11 is a transverse section of one side of the canopy showing guide rails and cross braces for the canopy taken on the line 11—11 of Fig. 12;

Fig. 12 is a plan of Fig. 11 taken in the direction of the arrow 12.

The brooder house designated generally by the numeral 11 is built preferably in two sections, the section 12 having hover and the section 13 having the run for the poultry and the various feed bins, etc. Each section is made separately and may be attached together, and for this purpose I utilize skids 14 and 15 for each section, the skids being attached by overlapping skid straps 16. Studs 17 are used at the sides and ends and support roof rafters 18 on which the roof 19 is supported. Each section has a closed end 20, the opposite end being open, and the abutting studs of the open ends are secured together by bolts 21, this not only securing the two sections firmly together by means of attachment of the skids but of the studs and roofing. The wall panels 22 are preferably made of heat insulating artificial boards, and extending substantially the length of the front of the complete building there is a window section 23 formed of a material which will transmit ultra violet light, such as the wire screening with a transparent material in the meshes of the screen. Above this there are a series of windows 24 which may be opened, these being hung on hinges at the top. These windows are also preferably made of the same material in order to allow the young poultry to have the benefit of the ultra violet light of the sun.

At one end of the section 13 on the front there is a large door 25 sufficient to allow ready passage of the attendant or person operating the brooder. At the front of the double house and at one end of the section 12 there is a trap door 26 hinged at the bottom as indicated at 27 so that this may swing outwardly and form a runway for the poultry from the interior house to a poultry yard constructed outside of the building. There are a pair of screen panels 28 hinged as indicated at 29 on each side of the trap door to fit against this door to form a runway to prevent the poultry from falling over the edge. This door has its hinges at a slightly higher elevation than the height of the skids. A fuel container 30 is mounted on the closed end of the section 12 of the brooder, and at the opposite end at the end of the section 13 there is a feed box 31.

The construction is made sufficiently substantial so that it may be pulled on its skids from one part of a poultry yard to another or even from one part of the poultry farm or ranch to another, but the construction of the brooder house is such that it may be readily disassembled for shipment and likewise readily assembled again.

The interior of the section 12 of the brooder is illustrated particularly in Figs. 4, 5, and 6. At one end, that is, the end having the fuel tank 30, there is an inner wall 32. This is secured at the bottom to a cross rail 33 and at the top to a cross rail 34, which latter has an opening 35 therein. A canopy 36 is constructed by using angle irons 37 extending between the front and the back walls of the building, a detail attachment of which is described hereinunder. This canopy is made with a fixed section 38 and with a movable section 39. These sections are preferably made of sheet metal, the movable section sliding over the fixed section in a manner hereinunder detailed. Suspended below this canopy and preferably from one of the angle irons there is a heating unit 40 which, in this instance, is shown as an oil fuel heater and may be of a standard type now in the market. This is provided with a cover 41 to deflect the heat rising from the heater. There is a ventilating opening 42 in the inside wall 32, this being permanently open, and by means of an air passage 43 between the end wall and this inner wall 32 and the opening 35, a constant air circulation will follow the path of the arrows 44. There are also inside walls 45 on the front and the back having openings 46. Longitudinal rails 47 extend longitudinally of the back and front of the building and these have openings 48 therein for ventilation, the control of which is as hereinunder detailed.

Inside of the hover section of the brooder building, there is an elevated water tank 49 with a filling pipe 50 extending outwardly through the back wall. This tank has a feed pipe 51 controlled by a valve 52 leading to a water trough 53. The heat of the brooder building maintains this water at a sufficiently warm temperature.

The canopy is illustrated as having the angle irons 37 extending from side to side and these are secured to longitudinal angles 54 secured to the inside walls 45 and to the rails 47. This arrangement is effected by cutting the horizontal flange 55 of the angles 37 as indicated at 56 (note Figs. 11 and 12) and extending the vertical flange 57 to the wall, such flange having a bent end 58 which fits underneath the flange 54 and is secured to the inside, front, and back walls. As above mentioned, the canopy has a fixed section 38 and a movable section 39. Both of these sections are formed of sheet metal and the movable section has a transverse angle 59 (note Fig. 4) and to this angle there is secured a stud 60, and from this stud there extends a cable 61 which passes over a pulley 62 secured to the end 20, i. e., the left hand end of the brooder building. This cable passes upwardly as indicated at 63 (note Fig. 6) and leads to a pulley 65 on the roof rafter at the left hand end of the building. There is then a horizontal run 66 passing through suspending pulleys 67 from the roof rafters over a down pull pulley 68, this cable having a fall section 69 with a ring 70 or the like for pulling such cable. When this ring is pulled downwardly it pulls the movable section 39 of the canopy from the position illustrated in Fig. 4 to a position over the fixed part of the canopy. As these are smooth sheet metal sections the movable section slides freely on the fixed section. In order to slide the movable section into its extended position I employ a pair of cables 71 secured to each side of the movable canopy, this having an angle iron 72 across its end, giving a sufficiently stiff bracing construction. These cables pass over pulleys 73 on studs on the front and back wall, thence upwardly by leads 74 to pulleys 75 in the top rafters at the front and back of the building. There is then a diagonal lead for each cable, indicated at 76, to pulleys 77 on the rafter at the left hand end of the building or else to the upper portions of one of the end studs. Leads 76 thence engage to a single cable 79 which extends to a centrally positioned down pull pulley 80 attached to one of the center rafters, and there is then a downfall end 81 with an operating ring 82. Therefore, by pulling downwardly on this single ring a tension is exerted on the section 71 of the cable, pulling the movable section of the canopy from its housed to its extended position.

The movable section of the canopy has a screen 83 secured to its forward edge, that is, to the angle 72, and has a brace 84, from thence to the angle 59. This is for the purpose of preventing any of the poultry from flying to the top of the canopy. This screen, however, does not interfere with the air circulation.

The hover designated generally by the numeral 85 has an inner section 86 and an outer section 87. The end wall 32 is provided with a cross angle 88 and the inside walls 45 have longitudinally extending angles 89, these forming guides and supports. The relatively fixed section 86 of the hover has a inner end angle iron 90 and an outer end angle iron 91 (note Fig. 7), and between these angle irons there is a tubular curtain rod 92 secured to both angles. The angle 91 has perforations 93 and through these perforations and into the hollow rods 92 there are slidable curtain rods 94 of the outer section. This outer section has a metal bar 95 at its outer end to which the movable rods are connected. The angles 90, 91 and the bar 95 rest at the sides on the longitudinal angles 89 which are secured to the opposite inside walls 45. The inner angle 90 also rests on the end supporting angle 88. Each of these curtain rods is provided with curtain rings 96, from which depend curtains 97, there being a relatively fixed inner curtain 98 and a movable curtain section 99. Each of these curtains has cut out notches 100 with slits 101 between the notches. The inner or fixed section of the hover has a wire screening 102 secured to the angles 90 and 91. The bar 95 has a wire screen 103 attached thereto, this wire having a downwardly bent end 104. This screen 103 extends horizontally above the outer sections of the curtain rods 94 and is supported to slide and fit above a screen 102. These screens allow free circulation of air but prevent the young poultry from jumping or flying upwardly on the top of the hover curtain construction.

The outer curtain section of the hover may be telescoped inwardly, the rods 94 telescoping in the tubular rods 92. This bunches the outer curtain. Both sections of the hover may then be tilted upwardly into the position shown in dotted lines in Fig. 4 to allow cleaning of the floor below the hover. The curtains are spaced slightly above the floor of the brooder and as the curtains are arranged in rows they allow the young poultry to move freely in these rows and to pass from one row to the other, but the curtains are kept from contamination with dirt on the floor. If desired, the relatively fixed part of the hover may be used if only a small number of poultry are being handled; or for a larger number the outer section of the curtain may be extended.

A heat retaining plate 105 extends between the front and back walls of the building and is hingedly supported from the forward end of the movable section of the canopy so that when this section of the canopy is thrust inwardly this plate takes the angular position shown dotted in Fig. 4.

In the construction illustrated the heat unit 40 is illustrated as being of the oil burning type. The oil supply tank 30 is mounted outside of the building and at the hover end. A pipe 107 leads to the heater and may be controlled by a valve 108 at the burner. It is manifest, however, that other types of heating may be used, such as electricity, gas, or other suitable means. Also, if desired, the heating unit may be readily shifted by moving this from one position to another underneath the canopy. This is especially desirable where only one section of the hover is used.

The ventilation through the openings 46 in the front and back inside walls 45 through the openings 48, to the rails 47, is controlled by means of ventilating dampers 109 which slide on the rail 47 and are operated by damper rods 110 which extend longitudinally of the front and back walls of the building. Above the rails 47 these rods extend through holes bored in the studs and lead to any desirable place for manipulation.

The heat retaining plate 105 is secured to the angle 72 at the outer end by a hinged connection 111. The plate forming the outer section of the canopy, as above mentioned, is secured to the angle 72 and the heat retainer practically makes an air tight joint with this extension part of the canopy. This heat retaining plate may, for purposes of cleaning the hover section of the brooder, be swung upwardly on its hinges and rest against the screen 83. This screen is illustrated as being attached to the angle 72 by rings 112 which allow the screen to be folded downwardly into a horizontal position and lie on top of the other section of the canopy when the brace 84 is removed. This allows for convenient packing for shipping, etc.

In constructing the framing for the feeding section 13 of the brooder in a somewhat different manner from the section having the brooding and hovering part, I cut some of the studs, especially in the back wall and utilize diagonal supporting members 113. This leaves a space between these members on the floor for a feeding trough 114, which is supplied by means of a chute 115 from the feed box 31 which is outside of the brooder building and also for the installation of a second water trough 116 which is fed from a water tank 117 on the outside on the back of the building structure. This, therefore, leaves a large floor space for the run of the young poultry. The entrance door 25 is considerably removed from the covered or brooding end of the structure and thus opening this door does not chill this latter portion of the structure.

As above mentioned, the lighting system may be of material which transmits ultra violet light which, as is well known, is particularly beneficial, particularly to young poultry. When it is desirable to let them run in the yard, the trap 26 may be lowered and the runway may be connected to the front of the building structure. A great advantage in being able to move the poultry house with the brooder and contents intact on skids is that it may be shifted to virgin soil when the poultry yard becomes contaminated. This avoids a great loss which usually occurs in raising young poultry.

Another loss is avoided by my construction of a hover. The rows of curtains allow free movement of the poultry but when they feel the warmth of the warmed curtains they do not tend to huddle together and, therefore, rest contentedly, protected by the curtains from drafts and avoid crowding each other.

In order to separate the hover floor and the feeding floor of the building construction I employ a removable screen 119 which may be attached in place by cleats and lifted and suspended from the roof rafters, which will allow the poults to have a run of the complete building floor. They can then be confined to the feeding side of the building while the hover section is being cleaned or they can all be confined to the hover section at night.

The building may readily be disassembled; the floor of each building with its skids may form units; the front and back and ends of each building section form units. Each building has its own roof forming a joint at the center which may be covered with a water proof composition and covering, this being readily removed. The roof section is formed to interfit with the side and end walls so that when the walls are secured to the rafters by use of wood screws, the whole building forms a firm, substantial construction but allows ready disassembling for shipment.

Various changes may be made in the details of construction without departing from the spirit or scope of the invention as defined by the appended claims.

I claim:

1. A brooder having a floor, a canopy with a front and rear section thereover, two sides and an end wall extending between the canopy and the floor and having ventilating openings therein, a heat retainer at the end opposite the end wall, a hover formed of depending cloth fabric suspended above the floor, and a heating unit suspended above the hover, the suspension of the hover permitting circulation of heated air from the top, the front section of the canopy being slidable over the rear section to afford ready access to the hover.

2. A brooder having a floor, a canopy thereover, two sides and an end wall extending between the canopy and the floor, a heat retainer opposite the end wall having its bottom edge spaced from the floor to permit ventilation, a hover having a series of rows of curtains suspended above the floor, and a heating unit suspended above the hover, the canopy being formed in a plurality of sections, with an outer section slidable in relation to a fixed section to enlarge or decrease the effective canopy.

3. A brooder as claimed in claim 2, the curtains having outer sections slidable in relation to the other fixed sections.

4. A brooder having a floor, a canopy, opposite side walls, an end wall, and a heat retaining plate extending downwardly from the outer end of the canopy, there being an open space for permitting ventilation below said plate, a heating unit mounted between the floor and the canopy and between the walls, the canopy being formed in a plurality of sections, the section near the end wall being fixed, and the outer section being slidable in relation thereto to change the effective size of the canopy.

5. A brooder as claimed in claim 4, a hover structure formed of depending fabric suspended between the heating unit and the floor and having an inner relatively fixed section and an outer movable section to thereby permit changing of the effective size of the hover.

6. A brooder having a floor, a canopy in a plurality of sections, one being fixed and the other movable to house with the fixed section, two side walls and an end wall extending between the canopy and the floor, the outer section of the canopy having a heat retaining plate suspended therefrom, there being a space to permit ventilation beneath said plate, a hover formed of parallel curtains spaced apart in rows, the outer sections of the curtains being slidable as a unit in reference to the inner and fixed sections, a heating element suspended above the hover, said heat retaining plate being tiltable on sliding of the outer section of the canopy.

7. A brooder having a floor, a canopy structure, two sides and an end wall having ventilating openings, certain of said openings being controllable, the canopy having a fixed inner and a slidable outer section, the outer section being adapted to be shifted in a horizontally superposed relation to the fixed section, a heat retaining plate hingedly connected to the outer end of the movable section of the canopy, there being a space below said plate to permit ventilation, a hover formed with an inner and an outer section, the inner section having rows of curtains each on a fixed curtain rod and the outer section having curtain rods telescoping therewith each with a curtain thereon.

8. In a brooder, a building construction having a floor, walls, and a roof, inner walls spaced from the outer walls in the building, a canopy connected to the top of the inner walls and being parallel to the floor, a heat retaining plate depending from one end of the canopy having its lower end spaced from the floor, the inner walls having ventilation openings, and there being ventilation spaces between the inner and outer walls, a heating unit suspended below the canopy and above the floor, leaving the floor free, and means below the heating unit to prevent huddling of poults, such means permitting circulation of air.

9. In a brooder, a building construction having a floor, outer walls, and a roof, inner walls attached to the outer walls and having a canopy connecting the tops of said inner walls parallel to the floor, the outer end of the canopy having a depending heat retaining plate, the lower end of such plate being spaced from the floor, a hover formed with curtain rods having curtains arranged thereon in rows suspended from the rods mounted on the inner walls, said curtains being adjacent the floor, and a heating element positioned above the hover and below the canopy, the inner walls having ventilation openings above the hover communicating with ventilation spaces between the inner and outer walls.

10. In a brooder as claimed in claim 9, the canopy being formed in a plurality of parts, one portion being stationary and the outer portion being slidable with guides on the walls to support and guide the sliding section, cables connected to the sliding section and leading over pulleys, said cables on operation retracting and extending the movable part of the canopy.

11. In a brooder as claimed in claim 9, the hover being formed with inner and outer sections, the inner section being fixed from sliding movement and the outer section having rods telescoping in curtain rods of the inner section, and a screen connected to each section positioned over the top of its respective section, said hover when in the nested position being tiltable to permit cleaning of the floor.

12. In a brooder, a building construction having skids, a floor thereon, front, back and an end wall, and a roof, said construction having an opening opposite the end, inner walls at the front, back, and the end, a canopy connected to the upper edge of the inner walls and parallel to the floor, the outer end of the canopy having a depending heat retaining plate with a space at the bottom of the plate and the floor, a hover for poults positioned below the canopy, the inner walls having ventilating openings above the hover, there being air circulating passages between the inner and outer walls with means to control said passages, a heating element suspended below the canopy leaving an unobstructed floor, the canopy and hover being formed of sliding sections, an outer section of the canopy having cables connected thereto and leading toward the open end of the building with hand grips to operate cables to retract or to extend the canopy, the front of the building having a trap door to form a runway for the poults, an inside water tank mounted on one of the walls, a water trough connected thereto, and a supply means for the tank located on the outside of the building construction.

13. In a brooder as claimed in claim 12, an additional building construction mounted on skids and having a floor, an end, front and back walls, and a roof, and open at one end the two open ends of the building constructions being attached together to form a continuous building, and said additional building having feeding means for poults, and a removable screen separating the floors of the two buildings.

14. In a brooder, a building construction having skids, a floor, front and back walls, an end wall, and a roof, the floor with the skids, the sides, ends and roof being disconnectible as units, inner walls attached to the front and back and the end and having ventilating openings leading to air passages between the inner and outer walls, guide rails extending along the front and back at the top of the inner walls, a canopy mounted on said rails and having a fixed inner section and a slidable outer section, a hover formed of a frame having an inner set of tubular curtain rods and an outer set of rods telescoping therein, each set of rods having curtains positioned parallel one to the other, the frame with the curtain rods being suspended below the canopy, a heating element suspended below the canopy and above the hover, a heat retaining plate secured to the outer moving section of the canopy, there being a ventilation space between the bottom of said plate and the floor, said plate being tiltable to allow ready access below the canopy.

15. In a brooder, a hover construction comprising a frame having two ends with tubular curtain rods connected thereto, a set of telescopic curtain rods slidable in the tubular rods and being connected at their outer ends, curtains suspended on said rods, the outer set of rods telescoping as a unit, and the hover having a movable mounting to permit tilting of the hover as a unit when the outer rods are telescoped in the tubular rods.

ROLAND CURT RICKETTS.